UNITED STATES PATENT OFFICE.

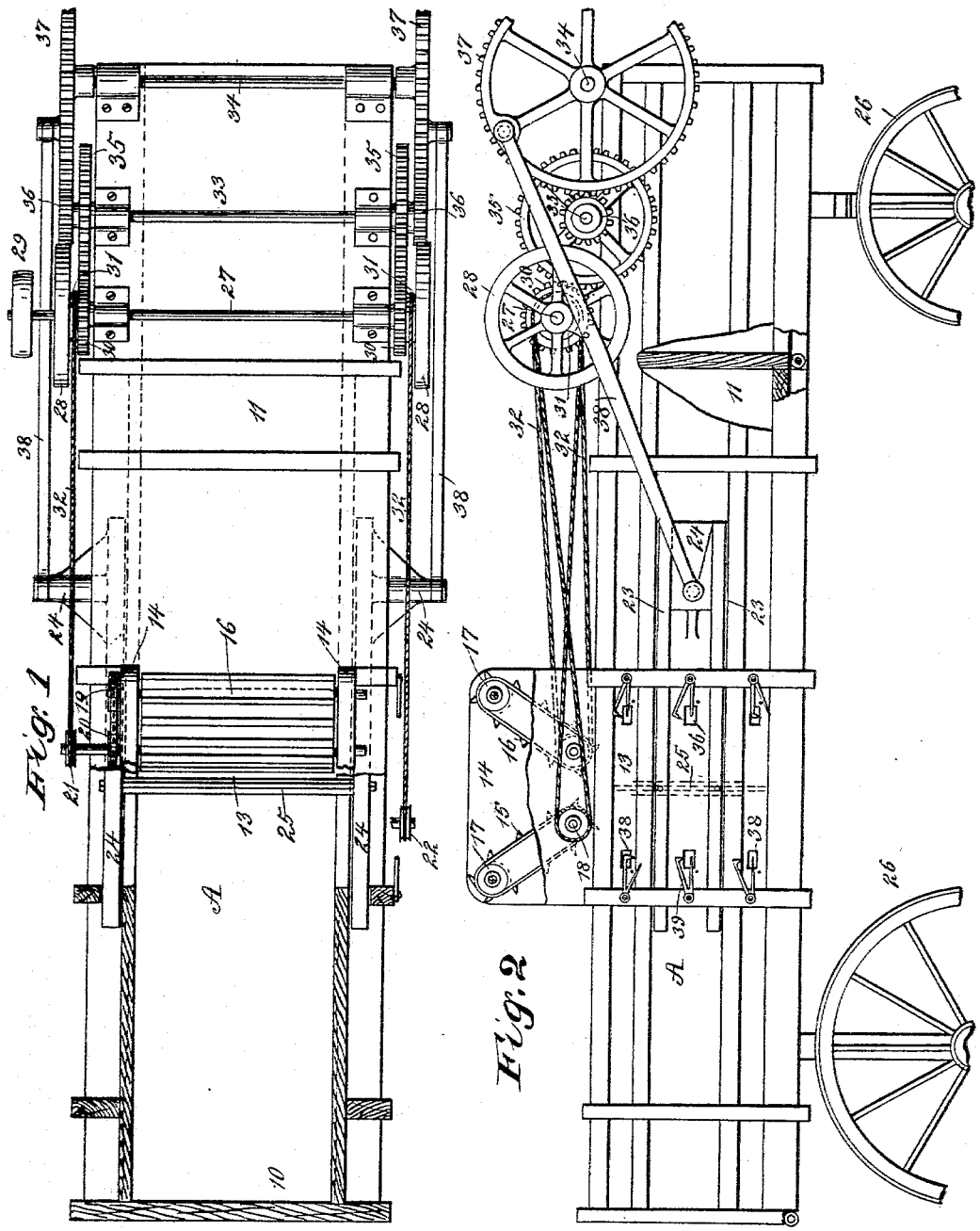

HEZEKIAH BAILEY, OF WILLAMINA, OREGON.

BALING-PRESS.

SPECIFICATION forming part of Letters Patent No. 531,895, dated January 1, 1895.

Application filed September 15, 1893. Serial No. 485,574. (No model.)

*To all whom it may concern:*

Be it known that I, HEZEKIAH BAILEY, of Willamina, in the county of Yam Hill and State of Oregon, have invented a new and Improved Baling-Press, of which the following is a full, clear, and exact description.

My invention relates to improvements in that class of baling presses in which a bale is formed at opposite ends of the press by the alternate strokes of the follower, and the invention consists in the novel construction and combination of the several parts, as will be hereinafter fully set forth and pointed out in the claim.

Reference is to be had to the accompanying drawings, forming a part of this specification, in which similar figures and letters of reference indicate corresponding parts in both the views.

Figure 1 is a partial plan view and partial horizontal section of the press; and Fig. 2 is a side elevation, parts thereof being broken away.

In carrying out the invention the body A of the press is of box-like construction, and at a point between its ends, usually near the center, the material to be pressed is to be fed into the body, a press chamber 10 being located at one end of the body, while a second press chamber 11, is located near the opposite end and at the opposite side of the feed chamber. Both of these press chambers are provided with suitable covers, while the space in which the material is to be fed, which may be termed a feeding chamber 13, is uncovered. At the top of the said feeding chamber standards 14 are located at each side of the body, being secured thereto in any suitable or approved manner, and the said standards are adapted to support two endless feed belts 15 and 16, which are inclined at their lower ends in direction of each other, one being placed at each side of the center, and therefore the space between the upper ends of the belts is greater than that between the lower ends. The endless belts pass over suitable drums 17, mounted on shafts 18, and the upper and lower drums of each belt are usually connected through the medium of sprocket wheels 19 and chain belts 20, as shown in Fig. 1, while the lower shaft of each feed belt is projected beyond the outer faces of the standards 14 and is provided with driving pulleys, the pulleys being located on opposite sides of the body, and one of them is designated as 21 and the other as 22. The endless feed belts are provided with cleats extending from side to side thereof, which are preferably made triangular in cross section, or practically so, their under faces being straight faces, as shown in Fig. 2. In the side portions of the body, between the two press chambers 10 and 11, slide-ways 23, are formed, and in each of the said slide-ways a slide 24, is located, and the two slides are connected by a follower 25. The follower is substantially of a height equal to that of the box, and likewise of practically the same width.

The body is suitably mounted upon wheels 26, as shown in Fig. 2, and the driving mechanism is as follows: Near the outer end of the press chamber 11 a driving shaft 27, is mounted in suitable bearings upon the top of the body, and said driving shaft extends beyond the sides of the body, being provided at both ends with a fly wheel 28, and at one end with a driving pulley 29, to which power is to be applied. The drive shaft is further provided near each end with a pinion 30 and a pulley 31, the said pulleys being connected by belts 32, with the pulleys 21 and 22 on the lower shafts of the feed belts, the belts being crossed as shown in Fig. 2. A second shaft 33, is journaled upon the body parallel with the shaft 27, and a third shaft 34, is likewise journaled upon the body parallel with the shaft 33. The shaft 33 carries near each end a gear 35, which gears mesh with the pinions 30 on the drive shaft 27. In this manner the shaft 33, is revolved; and said shaft 33, is further provided at each end with a pinion 36, and the said pinions mesh with large gears 37, mounted upon the outer ends of the outer shaft 34. Wrist pins are located upon the gears 37 near their peripheries, and through the medium of the said wrist pins and a pitman 38, a driving connection is effected between the large gears 37 and the slides of the follower.

It will thus be observed that material being fed into the hopper formed by the driving belts will be delivered by the feed belts into the receiving chamber 13 of the press, and that as the slide is reciprocated backward and forward the follower will alternately compress the material fed into the receiving chamber in bale form, first into the baling chamber 10 and next into the baling chamber 11, dumping the material at each stroke from the central portion of the receiving chamber. It will therefore be observed that the press is capable of receiving a continuous unbroken volume of material in the feed chamber, and that therefore such a press is a valuable adjunct to a thrashing machine, since it will bale the straw as fast as it is delivered from the thrasher, the delivery being made from the thrasher directly to the feed belts of the baling press if desired.

At each end of the receiving chamber 13 openings 38 are made in the sides of the press, the openings upon one side registering with those upon the other, and opposite each opening dogs 39, are loosely pivoted upon the outer face of the machine, which dogs are adapted to hold the loops of wires, or other tying material, which have been passed through the openings 38 while a tying is being effected.

The dogs 39 are formed of hooked upper members and plain lower members, as shown, and are held with their lower members opposite the openings 38 in the receiving chamber, by means of studs, upon which the lower members rest. Now when in this position and the needles carrying the looped wires are passed through the openings 38, the needles engaging the lower members of the dogs will push them off their studs, when the dogs will drop and their hook members enter the loops of the wires and hold them.

Having thus described my invention, I claim as new and desire to secure by Letters Patent—

In a baling press, the combination with a press box having a central receiving chamber, and end baling chambers, slides working in ways on the press box, and a follower connecting the slides, of two pairs of drums mounted above the receiving chamber, the shafts of the lower drums being provided with pulleys, endless feed belts passing around said drums, a drive shaft provided with a pinion and pulley at each end, cross belts passing from the pulleys of the drive shaft to and around the pulleys of the drums of the endless feed belts, a second shaft provided with a gear wheel and pinion at each end, the gear wheels meshing with the pinions of the drive shaft, and a third shaft provided with gear wheels having wrist pins and meshing with the pinions of the second shaft, and pitmen connected with the wrist pins and the slides of the follower, substantially as herein shown and described.

HEZEKIAH BAILEY.

Witnesses:
L. LINDEN,
C. C. LINDEN.